(12) United States Patent
Campian

(10) Patent No.: US 6,959,474 B2
(45) Date of Patent: Nov. 1, 2005

(54) NEST AND HOLD STATION FOR THE JOINING OF SHEET MATERIALS

(76) Inventor: Jonathon R. Campian, 4413 Hycliffe Dr., Troy, MI (US) 48098

( * ) Notice: Subject to any disclaimer, the term of this patent is extended or adjusted under 35 U.S.C. 154(b) by 30 days.

(21) Appl. No.: 10/652,776

(22) Filed: Aug. 29, 2003

(65) Prior Publication Data

US 2004/0040135 A1 Mar. 4, 2004

Related U.S. Application Data

(60) Provisional application No. 60/407,199, filed on Aug. 29, 2002.

(51) Int. Cl.[7] .............................................. B23P 11/00
(52) U.S. Cl. ...................... 29/243.58; 29/283.5; 72/293
(58) Field of Search ............................. 29/281.1, 283.5, 29/243.5, 243.57, 243.58; 72/293

(56) References Cited

U.S. PATENT DOCUMENTS

| 5,454,261 A | 10/1995 | Campian ...................... 72/384 |
| 5,752,304 A | * 5/1998 | Toeniskoetter ........... 29/243.58 |
| 6,029,334 A | 2/2000 | Hartley ......................... 29/464 |
| 6,029,493 A | 2/2000 | Maier et al. .................. 72/312 |
| 6,154,942 A | 12/2000 | Toeniskoetter ........... 29/243.58 |
| 6,182,492 B1 | 2/2001 | Raffin et al. .................. 72/454 |
| 6,305,208 B1 | 10/2001 | Zimmer ....................... 72/323 |
| 6,314,783 B1 | 11/2001 | Patrick ......................... 72/306 |
| 6,314,784 B1 | 11/2001 | Eloriaga et al. .............. 72/323 |
| 6,378,348 B1 | 4/2002 | Katsube ....................... 72/312 |
| 6,467,324 B2 | 10/2002 | Patrick ......................... 72/312 |
| 6,474,125 B1 | 11/2002 | Denis et al. .................. 72/306 |
| 6,477,881 B2 | 11/2002 | Eloriaga et al. .............. 72/323 |
| 6,487,888 B1 | 12/2002 | Baulier et al. ................ 72/418 |
| 6,508,099 B1 | 1/2003 | Baulier et al. ................ 72/418 |
| 6,578,401 B2 | 6/2003 | Baulier ........................ 72/312 |
| 6,640,601 B2 | * 11/2003 | Hatty .......................... 72/312 |

* cited by examiner

Primary Examiner—Jacob K. Ackun, Jr.
(74) Attorney, Agent, or Firm—Butzel Long

(57) ABSTRACT

A system and method for joining two articles together is disclosed. The nest and hold station of the present invention includes a positive alignment system which comprises two or more upper arms extending from the upper nest member and a like number of lower cooperative alignment components arranged on or about the lower nest member. The cooperative alignment system may be defined by pins fitted to the upper arms and pin-receiving apertures formed in the lower cooperative alignment components.

16 Claims, 3 Drawing Sheets

NEST AND HOLD STATION FOR THE JOINING OF SHEET MATERIALS

RELATED APPLICATIONS

This application claims priority to U.S. Provisional Ser. No. 60/407,199, filed Aug. 29, 2002.

TECHNICAL FIELD

The present invention generally relates to an apparatus for the joining of articles. More particularly, the present invention relates to an apparatus for joining at least two components together that are nested between an upper nest member and a lower nest member which includes an alignment system for aligning the upper nest member with the lower nest member.

DISCUSSION

Modern vehicle panels frequently are composed of an outer panel or skin and an inner panel that provides the outer skin with integral strength. These panels are joined together through a variety of methods, including welding, flanging and hemming (through metal forming).

Flanging and hemming (through metal forming) are the preferred methods of joining panels because of the resulting positive connection at a relatively low cost. An example of a flanging and hemming machine may be found in the Applicant's U.S. Pat. No. 5,454,261, issued on Oct. 3, 1995, for HEMMING MACHINE AND METHOD OF OPERATION. Other examples of known panel joining machines are set forth in U.S. Pat. No. 6,029,493 issued on Feb. 29, 2000, to Maier et al. for DEVICE FOR HEMMING OF SHEET METALS, PARTICULARLY OF COACHWORK SHEET METALS IN AUTOMOBILE MANUFACTURE, U.S. Pat. No. 6,314,783, issued on Nov. 13, 2001, to Patrick for ELECTROMECHANICAL HEMMING APPARATUS AND METHOD, and U.S. Pat. No. 6,378,348, issued on Apr. 30, 2002, to Katsube for HEMMING PROCESS AND HEMMING APPARATUS.

While all providing advancements in the state of the art of machines for joining two panels together, opportunity for design and feature improvement is always available. One of the difficulties of some known panel joining devices has to do with alignment. As is known in the art, the panels to be joined are placed between the separated and spaced-apart upper and lower nest members. Once in position, the upper nest member is moved toward the lower nest member until the panels are firmly captured there between. A difficulty arises in that the upper nest member and the lower nest member may move out of alignment with one another during the nesting process, resulting in the panels being improperly joined.

Accordingly, a system which allows the proper alignment of the upper nest member with the lower nest member while the panels to be joined are captured there between remains wanting.

SUMMARY OF THE INVENTION

In general, the present invention provides an apparatus for aligning an upper nest member of a panel fastening machine with the lower nest member which overcomes the known problems of the prior art.

Accordingly, it is an object of the present invention to provide such an apparatus which offers a positive and direct method of aligning the members.

It is a further object of the present invention to provide such an apparatus which offers a direct and positive alignment system without interfering with the operation of the working tool.

Still a further object of the present invention is to provide such an apparatus at a relatively low cost that is easy to operate and maintain.

These and other objects of the present invention are achieved by an apparatus which includes a positive alignment system comprising two or more upper arms extending from the upper nest member and a like number of lower cooperative alignment components arranged on or about the lower nest member. The cooperative alignment system may be defined by pins fitted to the upper arms and pin-receiving apertures formed in the lower cooperative alignment components. Other alignment arrangements, such as heal blocks or cone-shaped alignment elements and receivers, are possible.

Briefly, in operation, the panels to be joined are placed between the upper and lower nest members. One of the nest members is moved toward the other nest member and the alignment system functions to maintain proper alignment between the nest members during the critical panel capturing phase in which the panels are effectively held together between the panels. The joining process is undertaken and, when finished, the completed article is removed. Between joining procedures the upper nest member and the lower nest member are moved away from one another, moving the alignment components away from one another simultaneously, thereby allowing the next pair of panels to be joined to be easily inserted between the upper nest and the lower nest.

Other objects and features of the present invention will become apparent as the description proceeds.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENTS

The drawings disclose the preferred embodiments of the present invention. While the configurations according to the illustrated embodiment are preferred, it is envisioned that alternate configurations of the present invention may be adopted without deviating from the invention as portrayed. The preferred embodiments are discussed hereafter.

Figure 1:
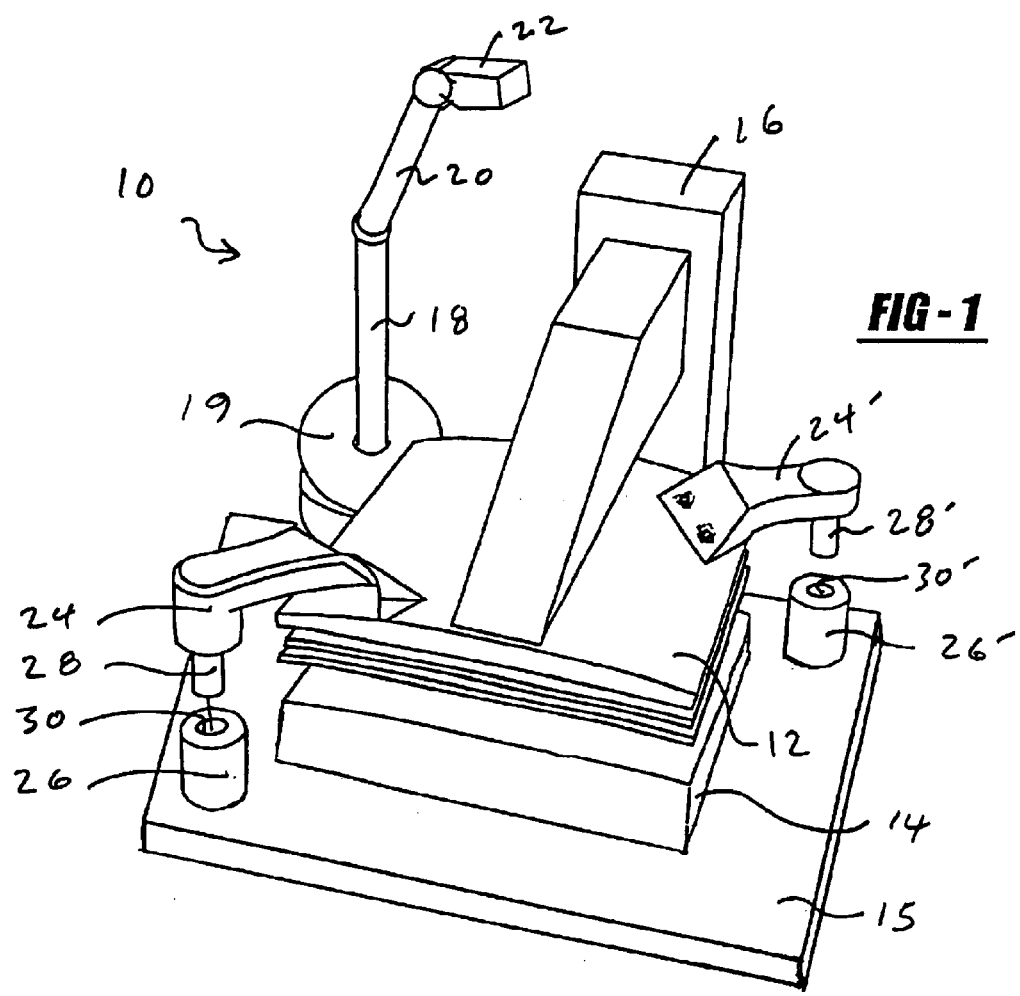
FIG. 1 is a perspective view of a nest and hold station according to a first embodiment of the present invention.

Referring to FIG. 1, a nest and hold station to the present invention, generally illustrated as 10, is shown. The nest and hold station 10 includes an upper nest member 12 and a lower nest member 14. It is to be understood throughout the description of the present invention that the illustrated configurations of the components, including the upper nest member 12 and the lower nest member 14, are used for illustration only and that other configurations may well be used. The lower nest member 14 is mounted on a base 15. (The base 15 may be a separate unit or may, in fact, be the shop floor.)

A vertical drive unit 16 is provided for selectively moving the upper panel 12 toward the lower panel 14. The drive unit 16 is fixedly mounted to the base 15. Of course, it could well be the case that the lower panel 14 is moved toward the upper panel 12 or both the upper panel 12 and the lower panel 14 are moved toward one another. Accordingly, only one drive unit 16 is illustrated but this arrangement may be modified by the addition of other drive units (not shown).

A joining tool 18 is shown in its between-joining position. The joining tool 18 is known in the art and is only described herein in the most rudimentary way. The joining tool 18 may be of a variety of types, including the illustrated roller type. The illustrated variation of the joining tool 18 includes a base 19, a robotic arm 20 and a forming roller 22. The robotic arm 20 is multi-jointed and is driven by a robotic driver (not shown) as is known in the art.

While only one joining tool 18 is illustrated it is to be understood that additional working tools may be included as speed of operations require. Specifically, where operations may move relatively slowly one working tool may be adequate. However, where it is desired that joining operations should be accelerated, additional working tools are to be added.

As illustrated in FIG. 1, the nest and hold station 10 is in its open position which is the position that the nest and hold station 10 would assume between hemming operations. In this position panels to be joined (not shown) may be readily inserted between the upper nest 12 and the lower nest 14. Similarly, the resulting joined article may be removed from the nest and hold station 10 once the joining operation has been completed.

Proper alignment between the upper nest member 12 and the lower nest member 14 is accomplished by the present alignment arrangement which comprises two upper arms 24, 24' and two lower cooperative alignment components 26, 26'. The two upper arms 24, 24' may be removably attached to the upper nest member 12 for interchangeability or may be integrally formed therewith.

As illustrated, the two lower cooperative alignment components 26, 26' are fixedly attached to the base 15. (Alternatively, the two lower cooperative alignment components 26, 26' may be integrally associated with the lower nest member 14.) It is to be understood that additional upper arms and a like number of lower alignment components may be added as desired which may be the case for very large joining machines.

As illustrated, each of the upper arms 24, 24' includes an alignment pin 28, 28' respectively. The pins 28, 28' are in vertical alignment with respective pin-receiving apertures illustrated as elements 30, 30'.

Of course, a variety of configurations may be selected for the alignment arrangement and the pin and pin-receiving configuration set forth is for illustrative purposes. For example, the pin and pin-receiving configuration may be substituted for by a male and female arrangement in which the male component is cone-shaped and the female receiver is cone-shaped. In addition, a heal block arrangement may be used in lieu of or in addition to the pin and pin receiver arrangement described above.

Figure 2:
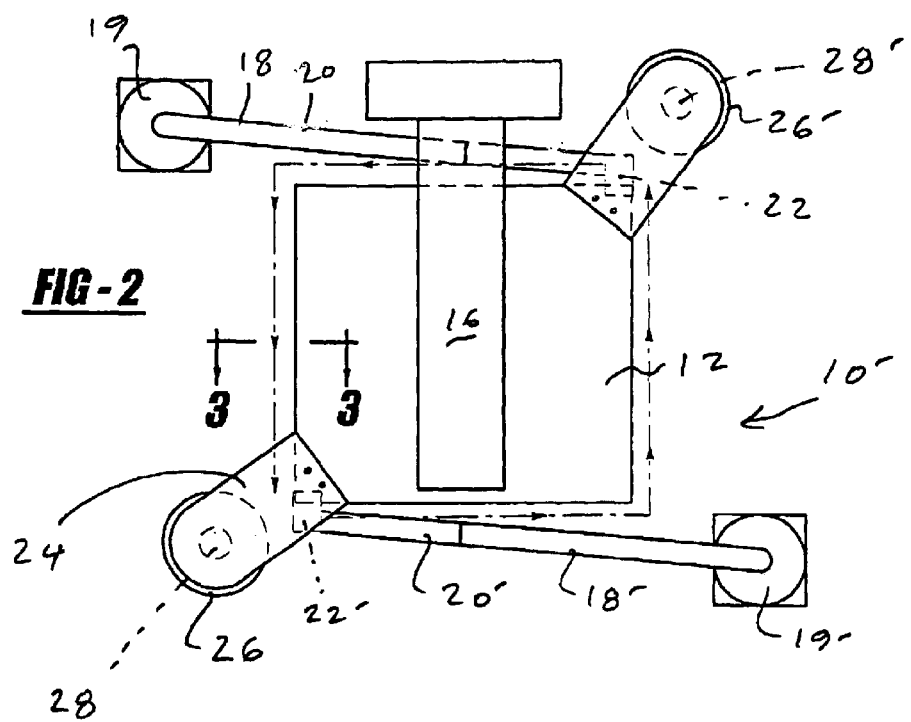
FIG. 2 is a top plan view of the nest and hold station of the present invention according to a second embodiment of the present invention.

FIG. 2 is a top plan view of an alternative embodiment of the nest and hold station of the present invention. The nest and hold station shown herein, illustrated as 10', differs from the nest and hold station 10 shown in FIG. 1 in that a single joining tool 18 is shown associated with the nest and hold station 10. As shown in FIG. 2, an additional joining tool 18' having a base 19', a robotic arm 20' and a forming roller 22', is included. This arrangement has particular application for high speed hemming operations as discussed above.

Figure 3:
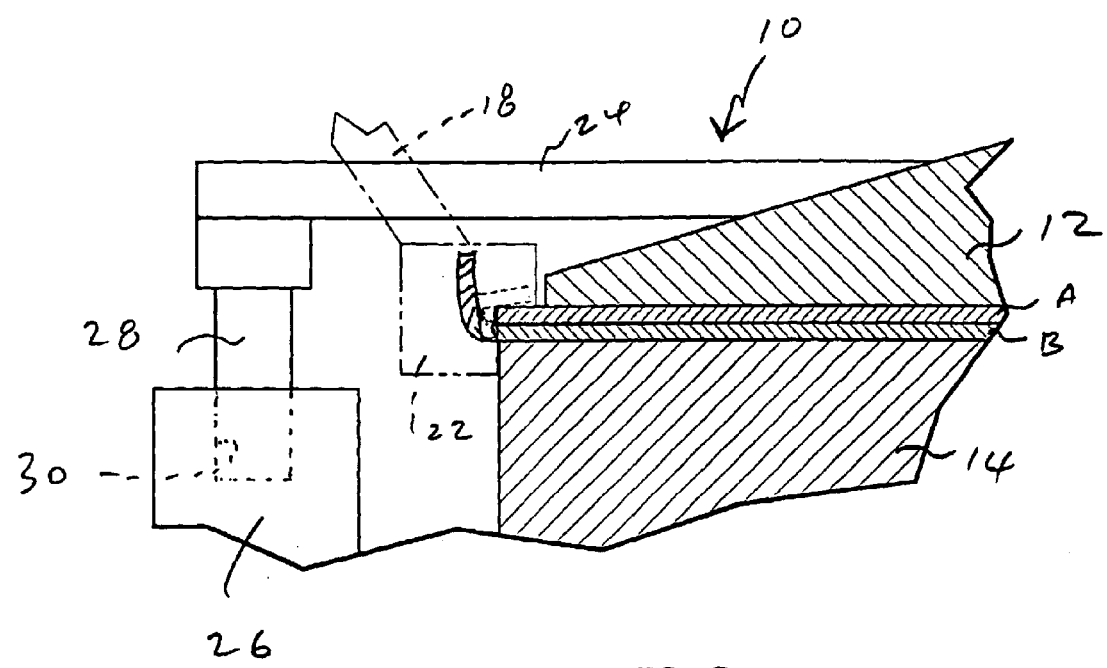
FIG. 3 is a sectional view of the nest and hold station of the present invention taken along lines 3—3 of FIG. 2.

FIG. 3 is a sectional view of the apparatus of the present invention taken along lines 3—3 of FIG. 2. In this figure the nest and hold station 10 (which could also be the nest and hold station 10' of FIG. 2) is illustrated as being positioned in its panel-holding mode. A pair of panels for joining—A and B—are illustrated captured and held between the upper nest 12 and the lower nest 14. In this illustration, panel A is the inner panel and panel B is the outer panel. Accordingly, the outer dimensions of panel B generally extend beyond those of panel A as illustrated.

In its holding position, the alignment pin 28 of upper arm 24 has been inserted into its associated pin-receiving aperture 30 of lower cooperative alignment component 26, thus perfecting alignment of the upper nest member 12 and the lower nest member 14. With the panels A and B thus held in proper alignment with respect to one another, the joining operation is undertaken by movement of the joining tool(s) 18. The arm 24 is formed such that the alignment pin 28 and the pin-receiving aperture 30 are spaced apart from the upper nest member 12 and the lower nest member 14, thus allowing the forming roller 22 easy access to the portion of the panel B that needs to be rolled over the panel A as shown in FIG. 3.

This aspect of the invention is clearly shown in FIG. 2. With reference thereto, the joining tools 18, 18' are operated for joining the two panels A and B. The joining tools 18, 18' are positioned such that the robotic arms 20, 20' have extended their respective forming rollers 22, 22' into position approximately between the two upper arms 24, 24' and two lower cooperative alignment components 26, 26'. As may be seen, the forming rollers 22, 22' easily execute the joining operation without interference from the alignment components of the present invention.

The general operation of the apparatus of the present invention will now be described. The upper nest member 12 and the lower nest member 14 are initially moved to their spaced apart configuration shown in FIG. 1. As shown therein, the upper arms 24, 24' are also spaced apart from their respective lower cooperative alignment components 26, 26'. With the nest and hold station in this position, the panels A and B to be joined are readily placed between the upper nest member 12 and the lower nest member 14.

With the panels A and B in place, the joining operation is initiated. According to the preferred embodiment, the upper nest member 12 is moved toward the lower nest member 14 as selectively driven by the drive unit 16. Movement of the upper nest member 12 toward the lower nest member 14 continues until the panels A and B are firmly held together. During the movement of the upper nest member 12 toward the lower nest member 14, proper alignment is effected by the entry of the alignment pins 28, 28' into their respective pin-receiving apertures 30, 30'.

Thus positioned, the joining tools 18, 18' (assuming a second joining tool is used) are engaged and the robotic arms 20, 20' respectively drive their associated forming rollers 22, 22' onto and around the panels A and B to undertake the joining operation. As has been described, the forming rollers 22, 22' have ready access for undertaking and completing the joining process between the alignment components of the present invention.

Once joining is completed, the drive unit 16 is again engaged, but this time in the reverse direction so as to move the upper nest member 12 away from the lower nest member 14. The completed article is removed and the nest and hold station of the present invention is prepared for its next joining operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for holding two panels to be joined, the apparatus comprising:
   an interchangeable lower nest member, said lower nest member having an upper surface upon which two panels to be joined may be placed;
   a lower alignment component, said lower alignment component being operatively associated with said lower nest member;
   an interchangeable upper nest member, said upper nest member being movable between a spaced apart position relative to said lower nest member and a substantially nested position relative to said lower nest member;
   an upper alignment component being operatively associated with said upper nest member, said upper alignment component being carried by said upper nest member, said upper alignment component being simultaneously movable with said upper nest member between a spaced apart position relative to said lower alignment component and a substantially mated position relative to said lower alignment component; and
   a joining tool, said joining tool having a joining portion operatively associated therewith;
   whereby said upper alignment component and said lower alignment component are positioned relative to said upper nest member and said lower nest member respectively such that said joining portion of said joining tool is able to pass substantially freely between part of said upper alignment component and part of said lower alignment component during the joining of the panels.

2. The apparatus of claim 1, wherein one of said upper alignment component and said lower alignment component includes a pin.

3. The apparatus of claim 2, wherein the other of said upper alignment component and said lower alignment component includes a pin-receiving aperture.

4. The apparatus of claim 1, wherein said upper alignment component includes a pin and said lower alignment component includes a pin-receiving aperture.

5. The apparatus of claim 1, wherein said upper alignment component includes an arm, said arm being attached to said upper nest member.

6. The apparatus of claim 5, wherein said arm is removably attached to said upper nest member.

7. The apparatus of claim 1, further including a driver for moving said upper nest member relative to said lower nest member.

8. The apparatus of claim 1, further including a pair of upper alignment components and a pair of lower alignment components, each of said pair of said upper alignment components being disposed opposite the other relative to said upper nest member and each of said pair of lower alignment components being disposed opposite the other relative to said lower nest member.

9. An apparatus for holding two panels to be joined, the apparatus comprising:
   a lower portion, said lower portion having a nest face upon which two panels to be joined may be placed, said lower portion including a lower alignment component fixedly associated therewith;
   an upper portion, said upper portion having a nest face which may be rested against one of the two panels placed on the nest face of said lower portion, said upper portion including an upper alignment component fixedly associated therewith;
   said lower and upper portions being movable with respect to each other between a spaced apart position in which the two panels may be positioned on said nest face to a substantially closed position in which the two panels are substantially captured between said upper and lower portions;
   a joining tool, said joining tool having a joining portion operatively associated therewith;
   whereby said upper alignment component and said lower alignment component are positioned relative to one another when said upper and lower portions are in their substantially closed position such that said joining portion of said joining tool is able to pass substantially freely between part of said upper alignment component and part of said lower alignment component during the joining of the panels.

10. The apparatus of claim 9, wherein one of said upper alignment component and said lower alignment component includes a pin.

11. The apparatus of claim 10, wherein the other of said upper alignment component and said lower alignment component includes a pin-receiving aperture.

12. The apparatus of claim 9, wherein said upper alignment component includes a pin and said lower alignment component includes a pin-receiving aperture.

13. The apparatus of claim 9, wherein said upper alignment component includes an arm, said arm being attached to said upper portion.

14. The apparatus of claim 13, wherein said arm is removably attached to said upper portion.

15. The apparatus of claim 9, further including a driver for moving said upper portion relative to said lower portion.

16. A method of joining two panels together, the method comprising the steps of:
   forming a joining apparatus, the apparatus including a joining tool and a nest and hold station, said nest and hold station having an upper portion and a lower portion, said upper portion including an upper alignment component fixedly associated therewith and said lower portion including a lower alignment component fixedly associated therewith, the lower portion further having a panel-receiving face formed thereon;
   moving said upper portion and its upper alignment component away from said lower portion and its lower alignment component such that the two panels may be fitted on said panel-receiving face of said lower portion;
   placing the panels on said panel-receiving face of said lower portion;
   moving said upper portion relative to said lower portion to hold the two panels there between;
   operate said joining tool so that edges of the panels are joined together around substantially the entire perimeter of the panels through the movement of said joining tool partially between a part of said upper alignment component and part of said lower alignment component.

* * * * *